United States Patent
Yilmaz (10) Patent No.: US 8,786,572 B2
(45) Date of Patent: Jul. 22, 2014

(54) TOUCH POSITION-SENSING PANEL AND METHOD

(75) Inventor: Esat Yilmaz, Eastleigh (GB)

(73) Assignee: Atmel Corporation, San Jose, CA (US)

( * ) Notice: Subject to any disclaimer, the term of this patent is extended or adjusted under 35 U.S.C. 154(b) by 186 days.

(21) Appl. No.: 12/939,794

(22) Filed: Nov. 4, 2010

(65) Prior Publication Data

US 2012/0113014 A1    May 10, 2012

(51) Int. Cl.
    *G06F 3/045*    (2006.01)
(52) U.S. Cl.
    USPC ............................................. 345/174
(58) Field of Classification Search
    USPC ................... 345/173–178; 178/18.06
    See application file for complete search history.

(56) References Cited

U.S. PATENT DOCUMENTS

| | | |
|---|---|---|
| 6,657,616 B2 | 12/2003 | Sims |
| 7,202,895 B2 | 4/2007 | Hirai |
| 7,663,607 B2 | 2/2010 | Hotelling |
| 7,864,503 B2 | 1/2011 | Chang |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 8,217,902 B2 | 7/2012 | Chang |
| 8,243,027 B2 * | 8/2012 | Hotelling et al. ............ 345/173 |
| 2002/0097231 A1 | 7/2002 | Satoh et al. |
| 2004/0239650 A1 | 12/2004 | Mackey |
| 2005/0207273 A1 | 9/2005 | Newman et al. |
| 2005/0270273 A1 | 12/2005 | Marten |
| 2007/0279395 A1 | 12/2007 | Philipp et al. |
| 2008/0309635 A1 | 12/2008 | Matsuo |
| 2009/0159344 A1 | 6/2009 | Hotelling et al. |
| 2009/0315854 A1 | 12/2009 | Matsuo |
| 2010/0045632 A1 * | 2/2010 | Yilmaz et al. ................. 345/174 |
| 2010/0265187 A1 * | 10/2010 | Chang et al. ................. 345/173 |
| 2010/0302201 A1 * | 12/2010 | Ritter et al. ................... 345/174 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.
Yilmaz, U.S. Appl. No. 12/891,329, "Position-Sensing Panel and Related Methods" Specification, Sep. 27, 2010.
Yilmaz, U.S. Appl. No. 12/891,329, Non-final Rejection from U.S. Patent and Trademark Office, Jun. 21, 2013.
Yilmaz, U.S. Appl. No. 12/891,329, Response to Non-final Rejection from U.S. Patent and Trademark Office, Oct. 21, 2013.

(Continued)

*Primary Examiner* — Sumati Lefkowitz
*Assistant Examiner* — Joseph Fox
(74) *Attorney, Agent, or Firm* — Baker Botts LLP (57) ABSTRACT

A touch position-sensing panel has electrodes arranged in different directions to form capacitive nodes, where at least one electrode has a corner within the perimeter of the electrode.

25 Claims, 5 Drawing Sheets

(56) References Cited

OTHER PUBLICATIONS

E. Yilmaz, U.S. Appl. No. 12/891,329, Final Office Action from U.S. Patent Office, Dec. 19, 2013.

E. Yilmaz, U.S. Appl. No. 12/891,329, Request for Continued Examination and Amendment filed with U.S. Patent Office, May 19, 2014.

* cited by examiner

TOUCH POSITION-SENSING PANEL AND METHOD

BACKGROUND

A position sensor can detect the presence and location of a touch by a finger or by an object such as a stylus within an area of an external interface of the position sensor. In a touch sensitive display application such as a touch screen, the position sensor enables direct interaction with what is displayed on the screen rather than indirectly with a mouse or touchpad. Position sensors can be combined with devices having a display, including but not limited to computers, personal digital assistants, satellite navigation devices, mobile telephones, portable media players, portable game consoles, public information kiosks, and point of sale systems. Position sensors have also been used as control panels on various appliances.

There are a number of different types of touch screens, such as resistive touch screens, surface acoustic wave touch screens, capacitive touch screens, etc. A capacitive touch screen, for example, may include an insulator coated with a transparent conductor in a particular pattern. A change in capacitance may occur when a finger or an object touches the surface of the screen. This change in capacitance may be processed by a controller to determine the position of the touch.

In a mutual capacitance configuration, for example, an array of conductive drive electrodes or lines and conductive sense electrodes or lines can be used to form a grid of capacitive nodes. Nodes are formed where drive and sense electrodes overlap and the sense electrodes are capacitively coupled with the drive electrodes. A pulsed or alternating voltage applied on the drive electrode induces a charge on the sense electrode. The amount of induced charge may be susceptible to external influence, such as from a nearby finger or object. When a finger or an object touches the surface of the screen, capacitance changes. The capacitance change may arise from changes to the fringe field between the drive and sense electrodes or outside the areas in which the drive and sense electrodes overlap. The capacitance change at each node on the grid can be measured to determine the location or position of the touch.

SUMMARY

As disclosed, a touch position-sensing panel has electrodes arranged in different directions to form capacitive nodes, where at least one electrode has a corner within the perimeter of the electrode.

BRIEF DESCRIPTION OF THE FIGURES

The figures depict one or more implementations in accordance with the present teachings by way of example, not by way of limitation. In the figures, like reference numerals refer to the same or similar elements.

DETAILED DESCRIPTION

In the following detailed description, numerous specific details are set forth by way of examples in order to explain the relevant teachings. In order to avoid unnecessarily obscuring aspects of the present teachings, methods, procedures, components, or circuitry that are well-known to one of ordinary skill in the art have been described at a relatively high level.

Reference now is made in detail to the examples illustrated in the accompanying figures and discussed below.

Figure 1:
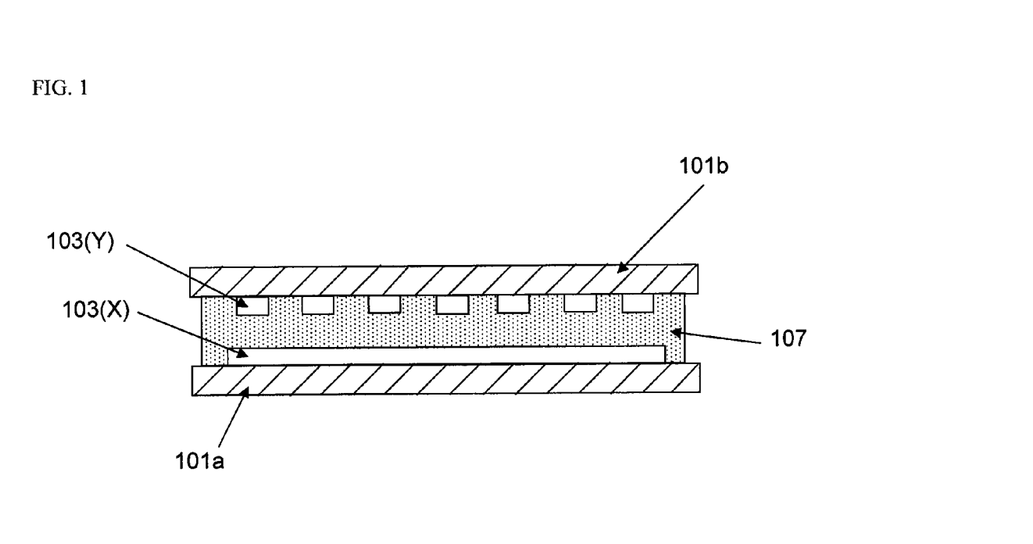
FIG. 1 illustrates schematically a cross section of a first exemplary position sensor.
Figure 2:
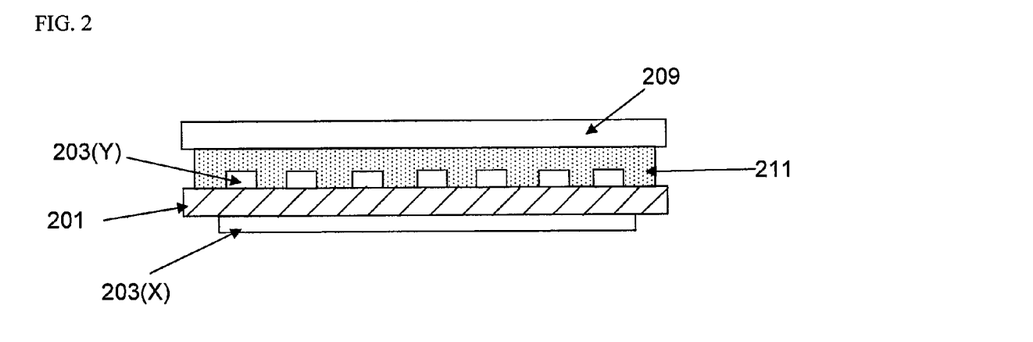
FIG. 2 illustrates schematically a cross section of a second exemplary position sensor.

FIGS. 1 and 2 show two exemplary arrangements of the relevant layers of drive and sense electrodes that may be used in position sensors. FIG. 1 shows drive electrodes 103(X) provided on a first substrate 101a and sense electrodes 103(Y) provided on a second substrate 101b. The drive electrodes 103(X) and the sense electrodes 103(Y) may be separated by a layer of non-conducting material 107, for example, an optically clear adhesive.

In another arrangement illustrated in FIG. 2, sense electrodes 203(Y) and drive electrodes 203(X) are formed on opposing surfaces of the same substrate 201. A transparent cover sheet 209 may be spaced apart from the sense electrodes 203(Y) with a suitable material, for example an optically clear adhesive layer 211.

Any of the substrates 201, 101a, 101b and the cover sheet 209 may each be formed from a transparent, non-conductive material such as glass or a plastic. Plastic substrates and cover sheets are suitable to provide flexibility to the position-sensing panel. Examples of suitable plastic substrate materials include, but are not limited to polyethylene terephthalate (PET), polyethylene naphthalate (PEN), and polycarbonate (PC). Examples of suitable plastic materials for the transparent cover sheet 209 include, but are not limited to, polycarbonate and poly(methyl methacrylate) (PMMA).

Capacitive sensing channels may be formed in regions surrounding where drive and sense electrodes overlap each other. These capacitive sensing channels may be formed when electric fields are generated between drive electrodes and sense electrodes. The capacitive sensing area may encompass substantially all of the capacitive sensing channels formed by the overlapping areas of the drive and sense electrodes on a touch sensing panel.

Figure 3:
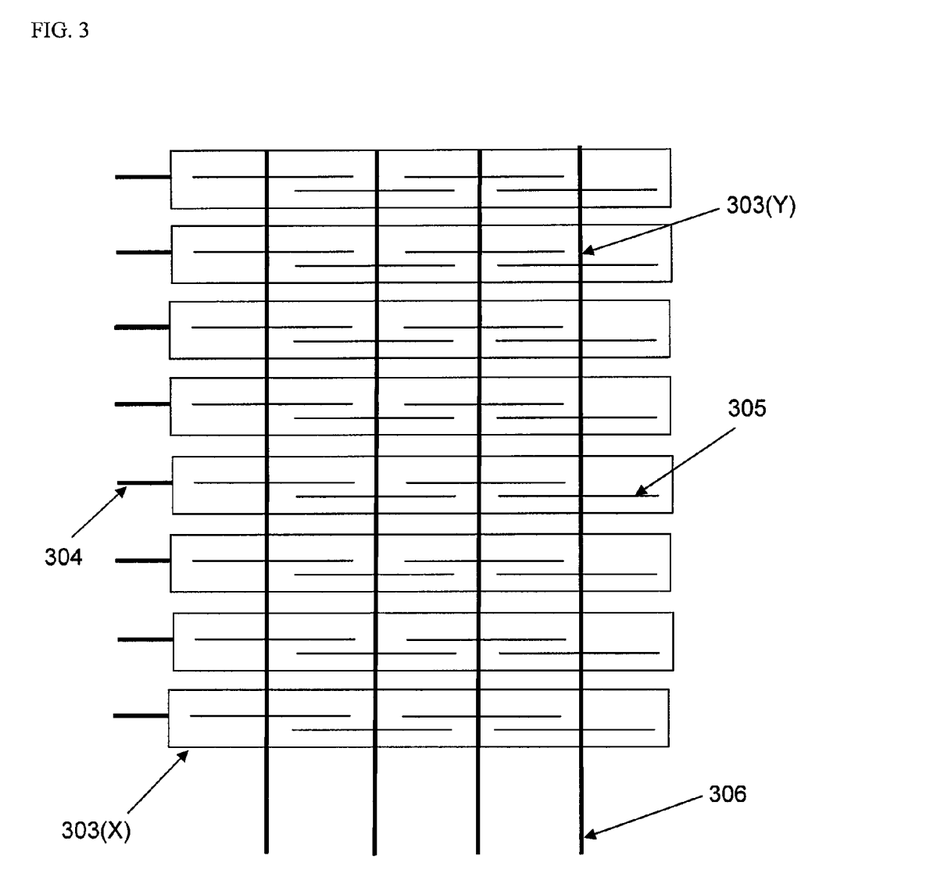
FIG. 3 illustrates schematically an exemplary layout of electrode for a position sensor.

FIG. 3 illustrates an electrode arrangement for another exemplary position sensor. Drive electrodes 303(X) extend in one direction, and sense electrodes 303(Y) extend in another direction. The sense electrodes 303(Y) may be provided with conductive crossbars 305 which may improve the accuracy of interpolation of position-sensing for positions between sense electrodes 303(Y), such as if the sense electrodes 303(Y) are spaced wide apart. The crossbars 305 may be substantially perpendicular to the portion of the respective sense electrode 303(Y). In some examples, when the sense electrodes 303(Y) are spaced more than about 4 mm apart, the conductive crossbars 305 are provided. In some examples, drive electrode connecting lines 304 and sense electrode connecting lines 306 may connect the drive and sense electrodes 303(X) and 303(Y) to a control unit, which is not shown.

In some examples, a transparent conductive material may be used to form the drive electrodes 303(X). Suitable conductive materials include transparent inorganic and organic conductive materials, such as indium tin oxide (ITO), antimony tin oxide (ATO), tin oxide, PEDOT or other conductive polymers, carbon nanotube or metal nanowire impregnated materials, and the like. Each drive electrode 303(X) may be formed from blocks of the conductive material.

In other examples, drive electrodes 303(X) may be formed from a mesh or other pattern of narrow lines of an opaque conductive material that is sized and shaped to allow transmission of light through the electrode. Lines of the opaque conductive material may be formed at a width not readily visible to the human eye in order to avoid any perceptible darkening or other loss of display quality. For example, drive electrodes 303(X) may be formed from a pattern in which individual lines of the pattern have a thickness no greater than 20 microns. Suitable opaque conductive materials include copper, silver, gold, aluminum, tin, and other metals suitable for use in conductive wiring.

In some examples, sense electrodes 303(Y) may be formed of a pattern of lines of an opaque conductive material that is sized and shaped to allow transmission of light through the electrode. The lines of opaque conductive material may be formed at a width not readily visible to the human eye in order to avoid any perceptible darkening or other loss of display quality. For example, sense electrodes 303(Y) may be formed from a pattern in which individual lines of the pattern have a thickness no greater than 20 microns. Suitable opaque conductive materials include copper, silver, gold, aluminum, tin, and other suitable metals used in conductive wiring.

In other examples, a conductive material may be used to form the sense electrodes 303(Y). Suitable conductive materials include transparent inorganic and organic conductive materials, such as indium tin oxide (ITO), antimony tin oxide (ATO), tin oxide, PEDOT or other conductive polymers, carbon nanotube or metal nanowire impregnated materials, and the like. Each sense electrode 303(Y) may be formed from blocks of the conductive material.

The size and separation of individual drive electrodes 303(X) and sense electrodes 303(Y) may be selected according to an application of the position sensor. An exemplary width of the drive electrodes 303(X) may be up to about 5 mm. In some examples, the width of the sense electrodes 303(Y) may be up to about 1 mm. The width of the crossbars 305 may be up to about 1 mm. The gap between adjacent drive electrodes 303(X) may be made as narrow as possible to enhance shielding of the sense electrodes 303(Y) against noise arising from the underlying display. The gap between adjacent drive electrodes may be no more than 300 microns. For example, the gap between adjacent drive electrodes 303(X) may be from about 10 to about 20 microns.

Figure 4:
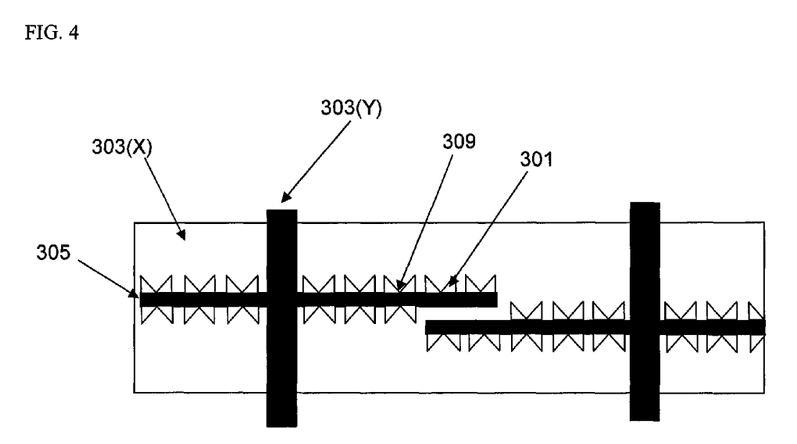
FIG. 4 illustrates schematically, in more detail, a portion of the electrode layout of FIG. 3.

FIG. 4 illustrates part of the electrode layout of FIG. 3 in greater detail. The illustrated drive electrode 303(X) may be formed from a block of conductive material as described above, and cut-out regions 301 may be formed within this block. The cut-out regions 301 may have inner walls that form corners 309 of the conductive material within the perimeter of the drive electrode 303(X). The corners 309 may be in regions surrounding but not within the area of overlap of the drive electrode 303(X) with a sense electrode 303(Y). In the example shown in FIG. 4, the corners formed by the cut-out regions 301 are around and entirely outside the area where crossbars 305 and drive electrodes 303(X) overlap. The presence of corners 309 in these regions may improve signal-to-noise ratio of touch sensing in these areas by increasing the strength of the electric field between the drive and sense electrodes 303(X) and 303(Y).

The corners 309 may be arranged in the lateral areas surrounding crossbars 305. In other examples, the corners 309 may be arranged in the lateral areas surrounding the overlap of the drive electrode 303(X) with the sense electrode 303(Y). In other examples, the corners 309 may be arranged in both the lateral areas surrounding the crossbars 305 and in the lateral areas surrounding the overlap of the drive electrode 303(X) with the sense electrode 303(Y).

Figure 5:
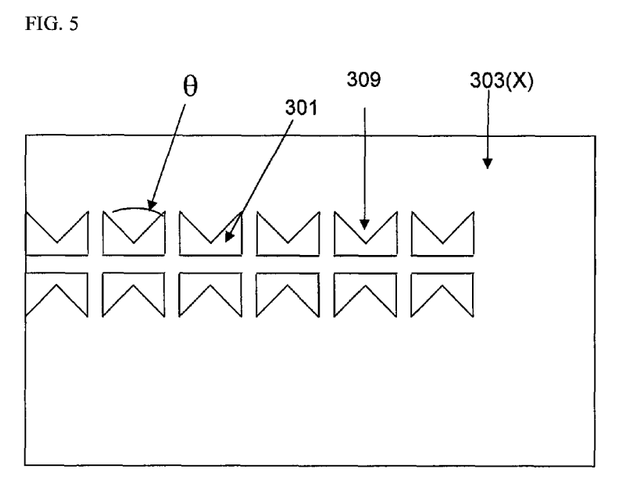
FIG. 5 illustrates schematically a portion of the drive electrode of the electrode layout of FIG. 4 in isolation.

FIG. 5 illustrates a part of the drive electrode 303(X) of FIG. 4 in isolation. The corners 309 of the conductive material of the drive electrode 303(X) formed by the cut-out regions 301, for example, may have an angle θ of 120 degrees or less. In the examples shown in FIGS. 4 and 5, the corners 309 of the conductive material of the drive electrode 303(X) formed by the cut-out regions 301 may have an angle θ somewhat less than 90 degrees.

Figure 7A:
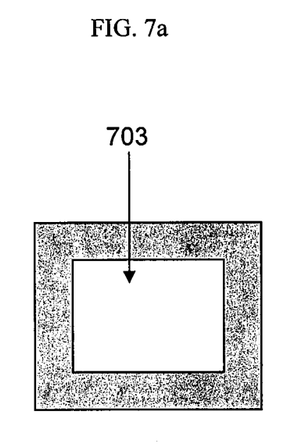
FIGS. 7a-b illustrate exemplary cut out portions of a drive electrode for a position sensor.
Figure 7B:
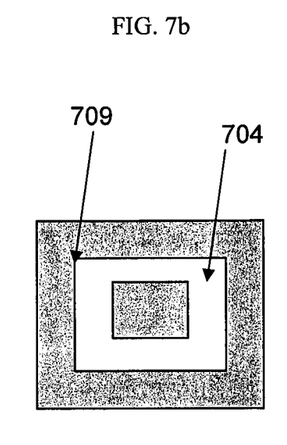

In the examples shown in FIGS. 4 and 5, each of the cut-out regions 301 forms a triangle, and walls of two adjacent triangles together define a corner 309. It will be appreciated that cut-out regions having any shape or combination of shapes capable of forming at least one corner may be provided. In some examples, the cut-out regions may have a rectangular shape, as is shown in FIG. 7a, which includes a rectangular-shaped cut out region 703. In other examples, the cut-out region may be a rectangular shaped strip 704, such as shown in FIG. 7b. As is seen in FIG. 7b, the rectangular-shaped strip 704 forms corners 709. In some examples, cut-out regions 301 may be arranged with no lateral spacing between an edge of the overlap areas and a corner 309 of an edge of a cut-out region 301, such as illustrated in FIG. 4. In some examples, the spacing between an edge of the overlap areas and a corner 309 or an edge of a cut-out region 301 is up to 1 mm. In other examples, the size of the cut-out regions may be up to 2 mm per side in a channel.

Cut-out regions 301 may be provided on at least one side of a sense electrode 303(Y). In some examples, cut-out regions 301 may be provided on at least one side of a crossbar 305. In other examples, cut-out regions 301 may be provided on at least one side of a sense electrode 303(Y) and a portion of a crossbar 305. In some examples, the cut-out regions may be of one or more different shapes.

Figure 6:
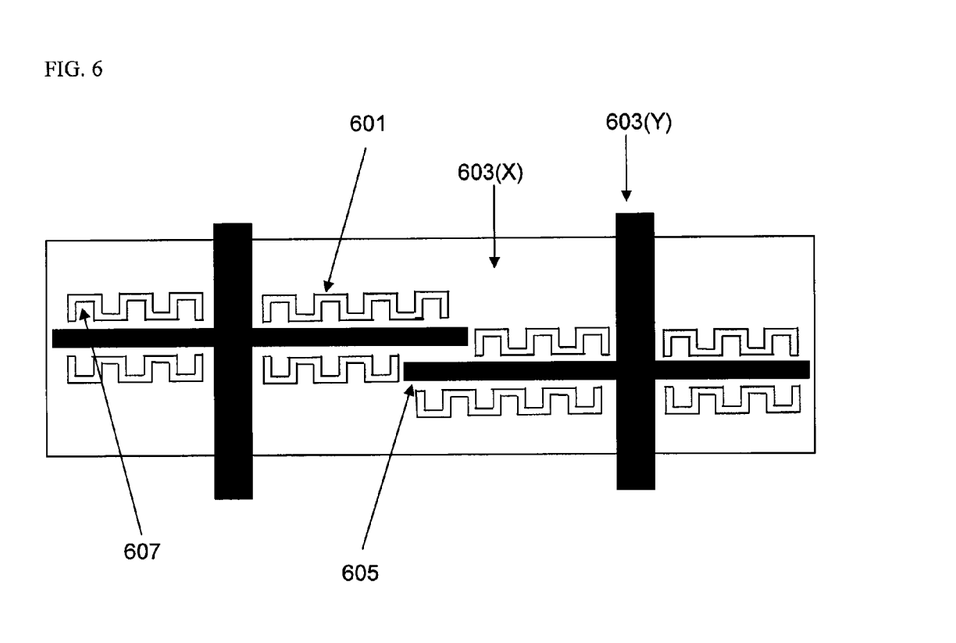
FIG. 6 illustrates schematically a portion of an electrode layout of another exemplary position sensor.

FIG. 6 illustrates a portion of another example of an electrode layout having cut-out regions 601 forming corners 607 within the perimeter of a drive electrode 603(X). In this example, each cut-out region 601 may be formed as a line having edges that form corners 607 in the conductive material. In this example, the cut-out regions 601 may be laterally spaced apart from the areas in which the sense electrodes 603(Y) and associated crossbars 605 overlap the drive electrode 603(X). In this example, corners 607 of the electrode material have angles at or about 90 degrees.

The process of manufacturing a position sensor of any of the types illustrated in FIGS. 1-6 may include steps of patterning the electrodes of the sensor. Where the electrodes are formed of ITO, a process of patterning the electrodes may include depositing a positive or negative resist over unpatterned ITO on a substrate; exposing the photoresist to UV light through a mask of the appropriate pattern; developing the resist by washing away unexposed resist with a solvent, and etching away the exposed ITO areas using a suitable etchant. The exposed photoresist may be removed using a suitable solvent.

One suitable example of an etching liquid for use in removing exposed ITO is an etching acid. Examples of a suitable liquid for removing the exposed photoresist include organic solvents. Other suitable positive and negative photoresists, etching liquids and photoresist removal liquids may also be used.

In another processing example, ITO may be deposited on a substrate by sputtering ITO onto the substrate using a shadow mask having a pattern suitable for formation of electrodes in any of the shapes described above.

Organic conductive materials such as PEDOT may be patterned using printing methods, such as ink-jet or screen printing. Patterning narrow lines of a conductive material may include deposition of the conductive material such as a metal, by evaporation through a mask in the appropriate pattern.

In other examples, narrow lines of conductive metal may be formed by a printing process in which a conductive material or conductive material precursor may be printed, for example, by inkjet printing, to form an electrode pattern. In the case where a catalytic precursor ink is used, the precursor ink is treated to convert the ink to a conductive material, such as by electroless plating.

In other processing examples, the substrate may be uniformly coated with a catalytic photosensitive ink which is exposed to UV light through a photomask or vector-exposed to UV light from a laser or other suitable light source and rinsed with solvent to wash away the unexposed ink. The remaining ink may be immersed in a metal plating bath to form the conductive lines.

Although some exemplary processes are given above for forming electrodes, it will be appreciated that any suitable way of forming these electrodes and conductors can be used in conjunction with the disclosure provided herein.

The position sensors described above can be attached to numerous electronic devices, such as computers, personal digital assistants, satellite navigation devices, mobile phones, portable media players, portable game consoles, public information kiosks, point of sale systems, etc. Any of the exemplary electronic devices may include a central processor or other processing device for executing program instructions, an internal communication bus, various types of memory or storage media, such as RAM, ROM, EEPROM, cache memory, disk drives, etc., for code and data storage, and one or more network interface cards or ports for communication purposes.

The position sensor may overlay a display of any of the aforementioned electronic devices, to form a touch-sensitive user interface. Exemplary displays include, without limitation, a liquid crystal display such as active matrix liquid crystal, electroluminescent, electrophoretic, plasma, cathode ray, organic LED, or the like. Light emitted from the display may pass through the position sensor so as to be visible to a user of the touch-sensitive electronic device.

The exemplary technologies discussed in the detailed description above may provide a touch position sensing panel with one or more properties of: thinness, shielding of the panel by the drive electrodes from electric field noise, high signal-to-noise ratio, high transparency and low manufacturing cost.

Various modifications may be made to the examples described in the foregoing, and any related teachings may be applied in numerous applications, only some of which have been described herein. It is intended by the following claims to claim any and all applications, modifications and variations that fall within the true scope of the present teachings.

The invention claimed is:

1. A touch position-sensing panel comprising:
    a sensing area;
    a first electrode formed of a conductive material arranged in a first direction, the first electrode comprising a perimeter and one or more cut-out regions, the cut-out regions being defined by one or more corners; and
    second electrodes formed of a conductive material arranged in a second direction different from the first direction such that the first and second electrodes form areas of overlap in the sensing area, at least one of the second electrodes comprising a branched portion extending in the first direction such that the branched portion forms an area of overlap with the first electrode;
    wherein areas of overlap between the first electrode and the second electrodes define a first region of the panel and areas inside the perimeter of the first electrode but outside the areas of overlap between the first electrode and the second electrodes define a second region of the panel, and the one or more cut-out regions of the first electrode are formed only within the second region of the panel.

2. The touch position-sensing panel of claim 1, wherein the first and second directions are perpendicular to each other.

3. The touch position-sensing panel of claim 1, wherein the first electrode is a drive electrode, and the conductive material of the first electrode comprises a transparent conductive material.

4. The touch position-sensing panel of claim 3, wherein the transparent conductive material comprises ITO.

5. The touch position-sensing panel of claim 3, wherein the second electrodes are sense electrodes, and the conductive material of the second electrodes comprises mesh patterns of a conductive metal.

6. The touch position-sensing panel of claim 1, wherein the conductive material of the second electrodes comprises a transparent conductive material.

7. The touch position-sensing panel of claim 6, wherein the transparent conductive material comprises ITO.

8. The touch position-sensing panel of claim 1, wherein the branched portion of the at least one second electrode extending in the first direction is substantially perpendicular to the second electrode.

9. The touch position-sensing panel of claim 1, wherein a corner of the cut-out regions has an angle of 120 degrees or less.

10. The touch position-sensing panel of claim 1, wherein a corner of the cut-out regions has an angle of 90 degrees or less.

11. The touch position-sensing panel of claim 1, wherein the cut-out regions are arranged along the first direction in lateral areas surrounding the branched portion.

12. The touch position-sensing panel of claim 1, wherein the first electrode is formed of a mesh of lines of an opaque conductive material.

13. A touch position-sensing panel comprising:
    at least one substrate having a first surface and a second surface separated from the first surface;
    a plurality of first electrodes formed on the first surface, each first electrode comprising a perimeter and one or more cut-out regions, the cut-out regions being defined by one or more corners;
    a plurality of second electrodes formed on the second surface; wherein:
        the first electrodes are comprised of a conductive material arranged in a first direction,
        the second electrodes are comprised of a conductive material arranged in a second direction such that the first and second electrodes form areas of overlap,
        at least one of the second electrodes comprises one or more branched portions extending in the first direction such that each branched portion forms an area of overlap with a first electrode, and
        areas of overlap between the first electrodes and the second electrodes define a first region of the panel and areas inside the perimeters of the first electrodes but outside the areas of overlap between the first electrodes and the second electrodes define a second region of the panel and the one or more cut-out regions of the first electrode are formed only within the second region of the panel.

14. The touch position-sensing panel of claim 13, wherein the first and second directions are perpendicular to each other.

15. The touch position-sensing panel of claim 13, wherein the first electrodes are drive electrodes, and the conductive material of the first electrodes comprises a transparent conductive material.

16. The touch position-sensing panel of claim 15, wherein the transparent conductive material comprises ITO.

17. The touch position-sensing panel of claim 15, wherein the second electrodes are sense electrodes, and the conductive material of the second electrodes comprises mesh patterns of a conductive metal.

18. The touch position-sensing panel of claim 13, wherein the conductive material of the second electrodes comprises a transparent conductive material.

19. The touch position-sensing panel of claim 18, wherein the transparent conductive material comprises ITO.

20. The touch position-sensing panel of claim 13, wherein the branched portion of the at least one second electrode extending in the first direction is substantially perpendicular to the second electrode.

21. The touch position-sensing panel of claim 13, wherein a corner of the cut-out regions has an angle of 120 degrees or less.

22. The touch position-sensing panel of claim 13, wherein a corner of the cut-out regions has an angle of 90 degrees or less.

23. A method of forming a touch position-sensing panel comprising steps of:

forming a first conductive layer comprising a plurality of first electrodes formed of a transparent material, on a first surface of at least one substrate in a first direction, wherein each of the plurality of first electrodes comprises a perimeter and one or more cut-out regions, the cut-out regions being defined by one or more corners; and forming a second conductive layer comprising a plurality of second electrodes, on a second surface of the substrate in a second direction different from the first direction, such that the first and second electrodes form an area of overlap in a sensing area of the touch position-sensing panel, at least one of the second electrodes comprising one or more branched portions extending in the first direction such that each branched portion forms an area of overlap with a first electrode;

wherein areas of overlap between the first electrodes and the second electrodes define a first region of the panel and areas inside the perimeters of the first electrodes but outside the areas of overlap between the first electrodes and the second electrodes define a second region of the panel and the one or more cut-out regions are formed only within the second region of the panel.

24. The method of claim 23, wherein a corner of the cut-out regions has an angle of 120 degrees or less.

25. The method of claim 23, wherein a corner of the cut-out regions has an angle of 90 degrees or less.

* * * * *